3,164,613
HYDROXYBENZOTHIAZOLES AND METHODS
OF PREPARING SAME
William D. McElroy, 220 Ridgewood Road, and Emil H. White, 1713 Waverly Way, both of Baltimore, Md.
No Drawing. Filed Aug. 8, 1961, Ser. No. 129,963
6 Claims. (Cl. 260—243)

This invention relates generally to substituted benzothiazoles. More particularly, it is concerned with the synthesis of certain 2,6-disubstituted and 2,4-disubstituted benzothiazoles. It relates more specifically to 2-[2'(4'-carboxy)-thiazolinyl]-6-hydroxybenzothiazole, 2-[2'-(4'-carboxy)-thiazolinyl]-4-hydroxybenzothiazole, to novel syntheses of these and related compounds, and to the novel compounds obtained and employed as intermediates in such syntheses.

2-[2'-(4'-carboxy)-thiazolinyl]-6-hydroxybenzothiazole has the structural formula

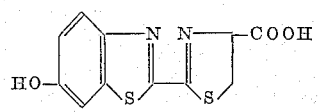

It has been obtained from extracts of the lantern of the American firefly *Photinus pyralis* where, presumably in combined form, it is an important factor in the light emission of the firefly. Heretofore no methods were known for the chemical synthesis of this benzothiazole. It is an object of the present invention to provide such a chemical synthesis, and to provide novel chemical compounds which are key intermediates therein. It is a further object to provide 2-substituted benzothiazoles having the general structural formula

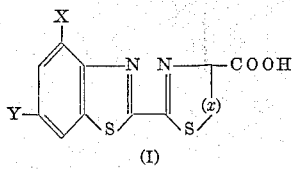

where $x$ is $>C(CH_3)_2$, $>CH_2$ or $CH_2$—$CH_2$, X and Y are H or OH and one of X and Y is H. A still further object is provision of chemical methods of making such compounds.

According to the present invention, it has now been found that 2-substituted-6-hydroxybenzothiazoles and 2-substituted-4-hydroxybenzothiazoles may be produced from a lower alkyl ester of N-(4-loweralkoxy)phenyl oxamic acid or N-(2-loweralkoxy)phenyl oxamic acid by the process represented below:

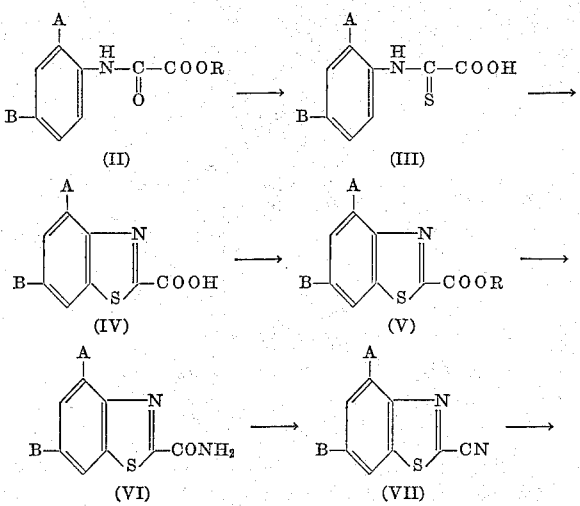

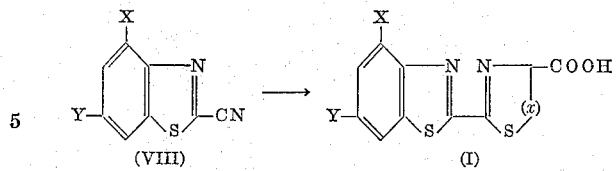

In the above flow chart, R represents a lower alkyl radical, A and B are hydrogen or lower alkoxy groups, and A and B are different in any given compound, X and Y are hydrogen or hydroxy, and X and Y are different in a particular compound, and $x$ is $>CH_2$, $>C(CH_3)_2$ or —$CH_2CH_2$—. Thus, compounds II through VII have one lower alkoxy group in the six-membered ring, which group is in the 4- or 6-position of the benzothiazole nucleus. Compounds I and VIII have a hydroxy group in either the 4- or 6-position of the benzothiazole ring system.

The following detailed description of our invention will, for the sake of clarity and convenience, be concerned primarily with the preparation of 2-cyano-6-hydroxybenzothiazole (VIII, X=H, Y=OH), from lower alkyl N-(4-methoxy)phenyl oxamate (II, A=H, B=OCH₃), and with the conversion of 2-cyano-6-hydroxybenzothiazole into 2-[2'-(4'-carboxy)thiazolinyl]-6-hydroxybenzothiazole (I, X=H, Y=OH, $x$=>CH₂). It is to be understood, however, that the methods described for making these compounds apply also to the synthesis of the other substances included with the above flow sheet.

In the first step of our process a lower alkyl N - (4-methoxy)phenyl oxamate, such as methyl, ehtyl or propyl N-(4-methoxy)phenyl oxamate, is converted to the corresponding thiooxamic acid by reaction with phosphorus pentasulfide and treatment of the resulting product with a base, and preferably with an alkali metal hydroxide such as sodium or potassium hydroxide. The reaction is preferably carried out at elevated temperatures of from about 80° C. to about 150° C. in an inert organic solvent such as benzene, toluene or xylene. Reaction times of from 30 minutes to 2 hours are normally adequate for optimum yields. It is convenient to follow the course of the reaction by measuring the change in ultraviolet spectrum of the products. The starting material has an absorption peak in the ultraviolet spectrum at 283 mμ whereas this peak disappears and is replaced with a peak at 330 mμ in the 4-methoxyphenyl thiooxamic acid compound. On completion of the phosphorus pentasulfide reaction, the entire reaction mixture is extracted with aqueous base such as aqueous sodium or potassium hydroxide. The 4-methoxyphenyl thiooxamic acid, represented by Formula III in the above flow diagram, is conveniently recovered in solid form by by acidification of the alkaline extract. This product is highly pure and may be conveniently employed without further purification in the next step of the reaction process. In addition to 4-methoxyphenyl thiooxamic acid, 4-ethoxyphenyl thiooxamic acid, 4-isopropoxyphenyl thiooxamic acid and 2-methoxyphenyl thiooxamic acid are obtained in this manner from the appropriate starting materials.

The next step of our process comprises the formation of 6-methoxybenzothiazole-2-carboxylic acid by oxidation of 4-methoxyphenyl thiooxamic acid. For this purpose oxidizing agents such as bromine or ferric chloride may be used, although an alkali metal ferricyanide such as sodium or potassium ferricyanide is the preferred oxidizing agent. The reaction with ferricyanide is carried out in the presence of a base such as an alkali metal hydroxide, and it is convenient to use a dilute aqueous solution of sodium or potassium hydroxide as the solvent medium. For optimum results the temperature of the reaction mixture is maintained below 25° C. and preferably in the range of 0–15° C. An alkali metal salt of 6-methoxybenzothiazole-2-carboxylic acid precipitates from the reaction mixture and is conveniently converted to the free acid with a mineral acid such as hydrochloric, hydrobromic or sulfuric acid. Other 6-loweralkoxybenzothiazole-2-carboxylic acids and the 4-loweralkoxybenzothiazole-2-carboxylic acids are obtained in similar fashion from the thiooxamic acid precursor.

The 6-methoxybenzothiazole-2-carboxylic acid (IV, A=H, B=OCH$_3$) is converted to an ester in the next step of our synthesis. It is preferred to make a lower alkyl ester such as the methyl, ethyl, propyl, isopropyl or amyl ester although other esters such as a benzyl ester could be employed if desired. Esterification may be effected either by treatment of the free acid with a diazoalkane in an anhydrous medium or by reaction of the acid with a lower alkanol in the presence of a mineral acid. Thus, one convenient method involves intimately contacting 6-methoxybenzothiazole-2-carboxylic acid with a slight molar excess of a diazoloweralkane such as diazomethane or diazoethane. This reaction is preferably carried out in an ether medium at temperatures in the range of from about 5° C. to about 20° C. Alternatively, the free acid may be dissolved in alkanolic hydrogen chloride or hydrogen bromide and the resulting mixture allowed to stand for at least about 3 hours at room temperature or above. The ester thus formed is crystallized by cooling the solution to about 0° C. or below. It is conveniently purified by recrystallization from a lower alkanol.

The succeeding reaction involves conversion of the ester (V) to 6-methoxybenzothiazole-2-carboxamide (VI), a process which is brought about by treating a lower alkanolic solution of the ester with ammonia at elevated temperatures. An excess of ammonia is normally used and the reaction allowed to proceed for from 15 to 120 minutes, at or near the reflux temperature of the alcoholic solvent. The desired amide is insoluble in the reaction medium and is conveniently recovered by cooling of the mixture and filtration. Other amides of Formula VI, such as 6-ethoxybenzothiazole-2-carboxamide, 6-isopropoxybenzothiazole-2-carboxamide and 4-methoxybenzothiazole-2-carboxamide are obtained in similar fashion from the corresponding ester of Formula V. Although the preferred method of obtaining these amides is from the ester as just described, they may be produced, in accordance with an additional aspects of this invention, from the free acid IV or from the corresponding acid halide by reaction of such compounds with ammonia.

In the next step of our process, the amide is reacted with a phosphorus oxyhalide such as phosphorus oxychloride or phosphorus oxybromide at an elevated temperature for a short period of time. Under these conditions the amide is converted to 2-cyano-6-methoxybenzothiazole, the compound of Formula VII above. The 2-cyano compound is recovered in substantially pure form by decomposition of any excess phosphorus oxyhalide with a dilute base, extraction into a water-immiscible organic solvent and chromatography using an adsorbent such as activated alumina. These recovery procedures may, of course, be modified as known to those skilled in the art and are not a critical aspect of the present invention. In addition to 2-cyano-6-methoxybenzothiazole, 2-cyano-6-ethoxybenzothiazole, 2-cyano-6-isopropoxybenzothiazole and 2-cyano-4-methoxybenzothiazole are examples of other compounds which are within the scope of our invention and which are obtained in the same manner.

The 2-cyano-6-loweralkoxybenzothiazole or 2-cyano-4-lower alkoxybenzothiazole of Formula VII is then converted to 2-cyano-6-hydroxybenzothiazole or 2-cyano-4-hydroxybenzothiazole (VIII) by cleavage of the ether function with pyridine hydrochloride. This ether cleavage is conducted in a reaction medium comprising dry pyridine and under preferred conditions it is carried out at temperatures of from 150–250° C. for 30–120 minutes. An excess of hydrogen chloride is maintained in the medium. When the reaction is complete the 2-cyano-6-hydroxybenzothiazole or 2-cyano-4-hydroxybenzothiazole is conveniently recovered by neutralization of the reaction mixture with a weak base such as sodium carbonate or sodium bicarbonate. The benzothiazole is insoluble at a slightly basic pH and is recovered by filtration and purified by techniques such as chromatography and/or recrystallization from organic solvents.

In the final step of our process the 2-cyanobenzothiazole (VIII) is reacted with a mercapto compound to give the 2-substituted benzothiazole of Formula I. The particular mercapto compound employed will, of course, depend on the end product desired, and may be defined structurally as follows:

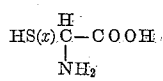

where $x$ is $>$CH$_2$, $>$C(CH$_3$)$_2$ or —CH$_2$CH$_2$—. When cysteine is intimately contacted with 2-cyano-4-hydroxybenzothiazole or with 2-cyano-6-hydroxybenzothiazole, there is produced 2-[2'-(4'-carboxy)-triazolinyl]-4-hydroxybenzothiazole or 2-[2'-(4'-carboxy)-thiazolinyl]-6-hydroxybenzothiazole, respectively. Reaction of the 2-cyano-4-(or 6)-hydroxybenzothiazole with penicillamine yields 2-[2'-(4'-carboxy-5',5'-dimethyl)-thiazolinyl]-4(or 6)-hydroxybenzothiazole, and treatment of the benzothiazole (VIII) with α-amino-γ-mercapto butyric acid leads to formation of 2-[2'-(4'-carboxy)-5,6-dihydro-4H-1,3-thiazinyl]-4(or 6)-hydroxybenzothiazole of the formula

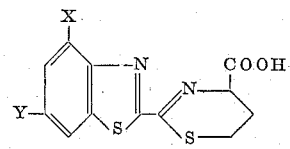

where one of X and Y is a hydroxy group and the other is hydrogen. This reaction is preferably conducted in an oxygen-free atmosphere in order to minimize decomposition and formation of undesired by-products. Satisfactory results are obtained by intimately contacting the two reactants in an aqueous alcoholic reaction medium such as aqueous methanol or ethanol at a slightly basic pH. As will be appreciated by those skilled in this art, the mercapto compound employed as one of the reactants has an asymmetric center and so may exist in the D-, L- or DL-forms. This center of asymmetry is not destroyed in the reaction so that substances of Formula I may be optically active depending upon the optical activity of the reactant. For instance, when D-cysteine is reacted with 2-cyano-6-hydroxybenzothiazole, there is obtained 1-2-[2'-(4'-carboxy)-thiazolinyl]-6-hydroxybenzothiazole. Correspondingly, the use of L- or DL-cysteine affords the d- and dl-isomers.

The 2-substituted benzothiazoles of Formula I are chemiluminescent on oxidation, and are thus of value as sources of cold light. The quaternary salts thereof are useful as optical sensitizers for photographic silver halide emulsions in that they extend the sensitivity to the red, infra-red and far red regions of the spectrum. The 1-2-[2'-(4'-carboxy)-thiazolinyl]-6-hydroxybenzothiazole is useful in the determination of or assay for adenosine triphosphate (ATP) in substances containing undetermined amounts of ATP because of its property of bioluminescence in a system containing it, magnesium ion, oxygen, the enzyme luciferase and ATP.

The following examples are given for the purpose of illustration and not by way of limitation:

EXAMPLE 1

*4-Methoxyphenyl Thiooxamic Acid*

28 g. of ethyl N-(4-methoxy)phenyl oxamate is dissolved in 560 ml. of boiling xylene. 8.4 g. of phosphorus pentasulfide is added slowly to the refluxing solution. The solution gradually turns black. Reflux is continued until the peak at 283 mµ in the ultraviolet spectrum has been replaced by a peak at 330 mµ. (Forty minutes reflux is generally sufficient). The reaction mixture is then cooled and extracted with 5 x 200 ml. of 1 N sodium hydroxide. The basic extracts are combined, filtered and cooled in ice. Crude 4-methoxyphenyl thiooxamic acid is precipitated by making the solution strongly acid with concentrated hydrochloric acid. The orange-yellow precipitate is collected and washed with cold water. This material is used without further purification in the next step. On purification by recrystallization from aqueous methanol it has M.P. 134–8° C. (dec.). The ammonium salt melts at 180° C. (dec.).

Similar results are obtained when other lower alkyl N-(4-methoxy)phenyl oxamates, such as methyl or propyl N-(4-methoxy)phenyl oxamate, are employed as starting material in the above procedure. When ethyl N-(2-methoxy)phenyl oxamate is treated in this manner with phosphorus pentasulfide, 2-methoxyphenyl thiooxamic acid is produced.

EXAMPLE 2

6-Methoxybenzothiazole-2-Carboxylic Acid

The 4-methoxyphenyl thiooxamic acid obtained in Example 1 is dissolved in 400 ml. of 1 N sodium hydroxide. This solution is added dropwise with continuous stirring to a solution prepared by dissolving 105 g. of potassium ferricyanide in 265 ml. of hot water and cooling to 8–10° C. The temperature of the reaction mixture is kept below 10° C. by cooling in an ice bath. Fifteen minutes after addition of the thioacid is complete, the precipitated sodium salt of 6-methoxybenzothiazole-2-carboxylic acid is removed by filtration and washed with 0.5 N sodium hydroxide. This salt may be recrystallized from methanol. This crude salt is converted to the free acid by slurrying in 500 ml. of water. After the slurry has been freed of lumps, it is brought to pH 1 with concentrated hydrochloric acid. The solid 6-methoxybenzothiazole-2-carboxylic acid is collected, washed with a small amount of ice water and dried under vacuum, M.P. 109–111° C. The sodium salt obtained as the immediate reaction product may be purified by recrystallization from methanol.

4-methoxybenzothiazole-2-carboxylic acid is made by the above process from 2-methoxyphenyl thiooxamic acid.

EXAMPLE 3

Methyl Ester of 6-Methoxybenzothiazole-2-Carboxylic Acid

A. 14 g. of 6-methoxybenzothiazole-2-carboxylic acid is slurried in 300 ml. of cold methanol. Ethereal diazomethane solution is added with continuous stirring until a slight excess is present. The reaction mixture is then allowed to stand in an ice bath for 15 minutes. The ether and excess diazomethane are then removed under vacuum, and the methyl ester of 6-methoxybenzothiazole-2-carboxylic acid is precipitated by addition of 500 ml. of water to the methanol solution. The product is collected and recrystallized from methanol using decolorizing charcoal, M.P. 142–143° C.

B. To a solution of 68.8 g. of 6-methoxybenzothiazole-2-carboxylic acid in 5 l. of methanol there is added a solution of 135 g. of anhydrous hydrogen chloride in 500 g. of methanol. The resulting solution is allowed to stand for 2 days at room temperature. It is then cooled to −10° C. for 15 hours and the resulting solid methyl ester of 6-methoxybenzothiazole-2-carboxylic acid collected by filtration. After two recrystallizations from methanol the melting point is 142–142.8° C.

The methyl ester of 4-methoxybenzothiazole-2-carboxylic acid is similarly obtained by treatment of the free acid with methanolic hydrogen chloride or with diazomethane by the procedures set forth above.

Other lower alkyl esters, such as the ethyl, propyl, iso- propyl and amyl esters, are produced by using the appropriate lower alkanol or diazoloweralkane in place of methanol or diazomethane.

EXAMPLE 4

6-Methoxybenzothiazole-2-Carboxamide 7 g. of the methyl ester of 6-methoxybenzothiazole-2-carboxylic acid is dissolved in 140 ml. of boiling methanol. The hot solution is saturated with anhydrous ammonia and kept hot for 30 minutes during which time 6-methoxybenzothiazole-2-carboxamide precipitates. The mixture is cooled and the amide collected in almost quantitative yield by filtration. Recrystallization from acetic acid or pyridine gives substantially pure material, M.P. 258–260° C. (dec.).

When methyl 4-methoxybenzothiazole-2-carboxylate is treated with anhydrous ammonia in the same way, 4-methoxybenzothiazole-2-carboxamide is formed.

EXAMPLE 5

2-Cyano-6-Methoxybenzothiazole 6.2 g. of 6-methoxybenzothiazole-2-carboxamide is mixed with 30 ml. of phosphorus oxychloride and the mixture heated under gentle reflux until all the amide dissolves (about 15 minutes). Heating is continued for 3 additional minutes. The solution is then cooled slightly and excess phosphorus oxychloride removed as completely as possible using a rotary evaporator. The residue is cooled in ice and the residual phosphorus oxychloride decomposed with 10% NaHCO$_3$ solution. A small amount of ether is added to prevent foaming. The pH of the slurry is adjusted to about 6. The slurry is then extracted with chloroform and the chloroform extracts dried over magnesium sulfate and evaporated to dryness. The residual 2-cyano-6-methoxy-benzothiazole is purified by chromatography over acid-washed alumina. A chloroform solution of 4 g. of the nitrile is evaporated with 50 g. of alumina and this added to a column of 300 g. of alumina packed in petroleum ether. Elution with ether/petroleum ether affords 2-cyano-6-methoxybenzothiazole, M.P. 129–131° C., after recrystallization from isooctane.

2-cyano-4-methoxybenzothiazole is obtained by treating 4-methoxybenzothiazole-2-carboxamide with phosphorus oxychloride as described in the preceding paragraph.

EXAMPLE 6

2-Cyano-6-Hydroxybenzothiazole

Pyridine hydrochloride is prepared from 25 g. of dry pyridine and 11.5 g. of anhydrous hydrogen chloride with protection from moisture by a drying tube. It is heated to 200° C. and 3 g. of 2-cyano-6-methoxybenzothiazole is added. Heating is continued for 36–60 minutes. The reaction mixture is then cooled and decomposed with 100 ml. of 10% sodium carbonate solution. The solution should not become strongly alkaline. The solid 2-cyano-6-hydroxybenzothiazole is then filtered off and dissolved in 75 ml. of ethanol. The solution is passed through a column of 3 g. of activated charcoal and 5 g. of Celite and the column washed with 150 ml. of ethanol. The eluates are combined and concentrated to a volume of about 50 ml. 2-cyano-6-hydroxybenzothiazole is precipitated therefrom by addition of water to the ethanolic concentrate. The product is recovered by filtration and recrystallized from ethanol/water or ethyl acetate to give substantially pure material, M.P. 211–213° C.

When 2-cyano-4-methoxybenzothiazole is treated in the same way, 2-cyano-4-hydroxybenzothiazole is formed.

EXAMPLE 7

2-[2'-(4'-Carboxy)-Thiazolinyl]-6-Hydroxybenzothiazole 416 mg. of D-cysteine hydrochloride monohydrate is dissolved in 8 ml. of oxygen-free water. The pH of the solution is adjusted to about 8.5 with 3.5 ml. of 1 N sodium hydroxide solution. This solution is then added to a stirred solution of 400 mg. of 2-cyano-6-hydroxybenzothiazole in 12 ml. of methanol under nitrogen. A gelatinous precipitate forms which dissolves in about 15 minutes. After the solution is stirred for 1 hour, it is filtered through Celite and acidified with 2 ml. of acetic acid. The solution is chilled for about 15 hours during which time 1-2-[2'-(4'-carboxy)-thiazolinyl] - 6 - hydroxybenzothiazole precipitates. The product is recovered by filtration and dried, M.P. 196° C. (dec.); $[\alpha]_D^{24} = -29°$ (DMF). When L-cysteine hydrochloride and DL-cysteine hydrochloride are employed in the above process, the d- and dl-forms of the 2-[2'-(4'-carboxy)-thiazolinyl]-6-hydroxybenzothiazole are produced. Correspondingly, reaction of 2-cyano-4-hydroxybenzothiazole with D-cysteine yields 1-2-[2'-(4'-carboxy)-thiazolinyl]-4-hydroxybenzothiazole.

EXAMPLE 8

*2-[2'-(4'-Carboxy)-5,6-Dihydro-4H-1,3-Thiazinyl]-6-Hydroxybenzothiazole*

When 324 mg. of α-amino-γ-mercapto butyric acid or 360 mg. of penicillamine are reacted with 400 mg. of 2-cyano-6-hydroxybenzothiazole by the procedure of Example 7 there is obtained 2-[2'-(4'-carboxy)-5,6-dihydro-4H-1,3-thiazinyl] - 6 - hydroxybenzothiazole or 2-[2'-(4'-carboxy - 5',5' - dimethyl) - thiazolinyl]-6-hydroxybenzothiazole, respectively. Use of 2-cyano-4-hydroxybenzothiazole in place of 2 - cyano - 6 - hydroxybenzothiazole affords the corresponding 2-substituted-4-hydroxybenzothiazoles.

Any departure from the above description which conforms to the present invention is intended to be included within the scope of the claims.

What is claimed is:
1. The process for making a compound of the formula

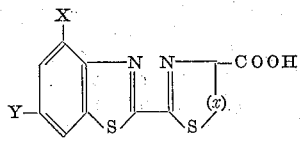

where X and Y are different members of the class consisting of hydrogen and hydroxy groups and $x$ is selected from the class consisting of $>CH_2$, $>C(CH_3)_2$ and $—CH_2CH_2—$, that comprises intimately contacting a benzothiazole of the formula

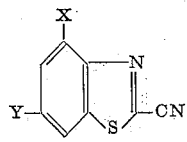

with an acid of the formula

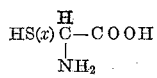

where X, Y and $x$ are as defined above.

2. The process for making 2-[2'-(4'-carboxy)thiazolinyl]-6-hydroxybenzothiazole of the formula

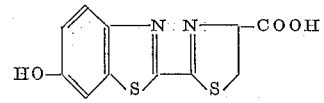

that comprises reacting together 2-cyano-6-hydroxybenzothiazole and cysteine.

3. The process for making 2[2'(4'-carboxy-5',5'-dimethyl) thiazolinyl] - 6 - hydroxybenzothiazole that comprises reacting together 2-cyano-6-hydroxybenzothiazole and penicillamine.

4. 2[2'-(4'-carboxy) - thiazolinyl] - 4 - hydroxybenzothiazole.

5. 2[2'-(4'-carboxy - 5',5' - dimethyl) - thiazolinyl]-6-hydroxybenzothiazole.

6. 2[2'-(4'-carboxy) - 5,6 - dihydro-4H-1,3-thiazinyl]-6-hydroxybenzothiazole.

References Cited by the Examiner
FOREIGN PATENTS
438,211   11/35   Great Britain.

OTHER REFERENCES

Goodman et al.: "Journ. of Organic Chemistry," vol. 23 (1958), pp. 1954–58.

Campaigne et al.: Chem. Abstracts, volume 23, pages 1344–6 (1929).

Knunyants et al.: Chem. Abstracts, volume 32, column 2119 (1938).

Mercury et al.: J. Am. Chem. Soc., volume 68, pages 1594–5 (1946).

Yoshikawa et al.: Chem. Abstracts, volume, 52, column 2642 (1958).

Elderfield: "Heterocyclic Compounds," volume 5, pages 511, 513.

IRVING MARCUS, *Primary Examiner.*

D. T. McCUTCHEN, WALTER A. MODANCE,
*Examiners.*